United States Patent Office 3,481,995
Patented Dec. 2, 1969

3,481,995
ETHYLENE DIHALIDE PROCESS
Robert L. Hartnett, Texas City, and Thomas C. Singleton, La Marque, Tex., assignors to Monsanto Company, St. Louis, Mo., a corporation of Delaware
No Drawing. Filed Mar. 24, 1966, Ser. No. 537,001
Int. Cl. C07c 17/02, 19/02; B01j 11/32
U.S. Cl. 260—662                                    7 Claims

ABSTRACT OF THE DISCLOSURE

Use of a naturally-occurring mineral silicate of the iron garnet group as a specific catalyst for the addition chlorination of ethylene, either as a pure gas or in dilute concentration in mixed gas streams, to produce an ethylene dihalide such as 1,2-dichloroethane.

---

The present invention relates to the production of olefin dihalides. More particularly, it relates to the production of olefin dihalides by the vapor-phase catalytic reaction of a halogen and an olefin either in the pure state or in relatively dilute concentration as it occurs in certain available commercial gas streams.

It has long been known that olefins and halogens can be reacted thermally in the vapor phase to produce olefin dihalides. It is universally recognized, however, that it is difficult to carry out this thermal halogenation reaction without simultaneously producing relatively large quantities of a number of undesired polyhalogenated by-products which create many costly operational and separation problems. The difficulties are even more pronounced when the feed material is a commercial gas stream containing the olefin in relatively dilute concentration and comprises for the most part hydrogen, minor amounts of other hydrocarbons such as methane, ethane, etc., and diluents such as nitrogen and $CO_2$. The other gases present appropriate the chlorine available for reaction with the olefin to form contaminants of little value and the olefin hydrogenation reaction under these conditions proceeds at an impractically low rate.

Photochlorination has also been employed but this type of reaction which is highly exothermic requires external heat transfer means and expensive process equipment.

Catalysts have also been proposed for accelerating the halogenation reaction. The results obtained with the catalysts of the prior art, however, have not been completely satisfactory because such catalysts accelerate both desirable and undesirable reactions and in many instances, the quantities of the undesired substitution products obtained exceed that of the desired addition product. Consequently, the yields are low and excessive amounts of the halogen reactant are consumed. Many of the known catalysts, too, have been relatively unstable and subject to rapid degeneration or loss of activity.

Accordingly, it is an object of the present invention to provide an improved process for the preparation of olefin dihalides by the vapor-phase reaction of olefins and halogens. It is another object of the invention to provide a specific and highly efficient catalyst for the vapor-phase halogenation of olefins which promotoes the addition reaction while suppressing undesirable substitution reactions. It is a further object of the invention to provide an improved process for the vapor-phase addition chlorination of ethylene. It is a still further object of the invention to provide an efficient catalyst for the vapor-phase addition chlorination of ethylene contained in dilute concentration in mixed gas streams such as those available from the cracking of ethane and other aliphatic hydrocarbons.

These and other objects and advantages of the invention which will become apparent from the following detailed description thereof are obtained by reacting a gaseous olefin with a halogen in contact with a naturally-occurring mineral silicate of the iron garnet groups as the catalyst. Any of the iron garnets such as andradite, almandite and the like can be employed. With these catalysts, in a preferred embodiment of the invention wherein ethylene is chlorinated to 1,2-dichlloroethane, once-through yields of 99% (based on chlorine) of the olefin dichloride are obtained and the reaction product contains only very minor amounts of chlorinated impurities.

The invention is illustrated in the following examples which, however, are not ot be construed as limiting it in any manner whatsoever.

EXAMPLE 1

A series of chlorination runs were conducted in a jacketed stainless steel tubular reactor about 9 ft. long and 2 in. inside diameter. The jacket was heated by means of electric windings controlled by temperature controllers activated by thermocouples located at appropriate levels along its length. Heat was transferred to the reactor through the medium of alumina fluidized between the walls of the jacket and the reactor by purging air into the bottom of the jacket. A thermowell containing thermocouples for measuring temperatures was centrally positioned in the reactor extending through its length. Enough garnet identified and made available commercially as "Florida C" garnet (60-mesh) by Continental Minerals Processing Corporation was charged to the reactor to provide a static bed height of about 4 ft. Based on its chemical analysis, this was a common garnet of the iron group known as andradite. The garnet was fluidized by passing nitrogen up through it while the reactor was heated up to the desired reaction temperature. All lines leading to the reactor were purged and the ethylene-containing feed gas and chlorine gas were introduced separately into the reactor maintained at the desired temperature where they were contacted with the fluidized garnet. Pressure in the reactor was maintained at about 15 p.s.i.g. and linear gas velocity through the catalyst bed was from about 0.43 to 0.45 ft. per second. In several of the runs, a small amount of HCl was added with the feedstream.

The effluent gas from the reactor was passed through oil-jacketed tubing to a hot box maintained at about 150° C. and provided with a glass wool filter. The total effluent gas after passing through the filter in the hot box flowed into the sample inlets of two vapor fractometers for analysis to determine the nature and quantity of the chlorinated compounds contained therein. The total effluent gas was also passed through a scrubber containing a concentrated solution of potassium iodide for a measured length of time for determination of its chlorine and HCl content by titration of the scrubber solution with sodium thiosulfate and sodium hydroxide, respectively. The analytical data obtained and the conversions and yields which were calculated therefrom are presented in Table I below along with the conditions under which they were obtained. It will be seen from these data that extremely high conversions to 1,2-dichloroethane are obtained in the chlorination and that the product is one of extremely high purity with relatively little contamination of the dichloroethane by other chlorinated compounds. The addition of a minor amount of HCl also promotes the reaction and increases conversion significantly.

TABLE I

|  | Run Number | | | |
|---|---|---|---|---|
|  | 1 | 2 | 3 | 4 |
| Feed Gas Composition, Mol Percent: | | | | |
| Ethylene | 16.6 | 17.6 | 17.3 | 17.5 |
| Ethane | 8.9 | 9.1 | 9.1 | 9.2 |
| Nitrogen | | 56.7 | 56.6 | 57.0 |
| Hydrogen | 55.2 | | | |
| Oxygen | 1.0 | 1.0 | 1.0 | 1.0 |
| Carbon Monoxide | 0.3 | | | |
| Hydrogen Chloride | 1.7 | | 0.9 | 0.2 |
| Chlorine, Mol Percent | 16.6 | 15.6 | 15.0 | 15.2 |
| Temperature Range, °C | 147–164 | 125–165 | 145–157 | 144–164 |
| Conversion of $Cl_2$, Percent | 99.2 | 97.1 | 99.6 | 99.7 |
| Chlorinated Products in Effluent Gas, Mol Percent: | | | | |
| 1,2-dichloroethane | 18.46 | 18.65 | 17.40 | 17.82 |
| Vinyl Chloride | 0.0042 | 0.0034 | 0.0048 | 0.0051 |
| Ethyl Chloride | 0.0329 | 0.0045 | 0.0188 | 0.0071 |
| 2-chloropropane | 0.0009 | [1] | 0.0046 | 0.0054 |
| 1,1-dichloroethylene | 0.0003 | 0.0002 | 0.0021 | 0.0023 |
| Trans-dichloroethylene | [1] | [1] | 0.0001 | Trace. |
| 1,1-dichloroethane | 0.0005 | 0.0003 | 0.0007 | 0.0008 |
| 1,1,1-trichloroethane | [1] | [1] | [1] | [1] |
| Cis-dichloroethylene | [1] | 0.0002 | 0.0002 | 0.0001 |
| Trichloroethylene | 0.0002 | 0.0007 | 0.0008 | 0.0006 |
| 1,2-dichloropropane | 0.0161 | 0.0346 | 0.0291 | 0.0223 |
| 1,1,2-trichloroethane | 0.0022 | 0.0030 | 0.0011 | 0.0022 |
| Tetrachloroethylene | 0.0059 | 0.0046 | 0.0057 | 0.0082 |
| $Cl_2$ | 0.158 | 0.556 | 0.067 | 0.0590 |
| HCl | [1] <0 | 0.112 | [2] <0 | 0.516 |
| Yield Loss of $Cl_2$ to Chlorinated Impurities, Percent | 0.26 | 0.60 | 0.31 | 0.50 |
| Single Pass Conversion of $Cl_2$ to EDC, Percent | 98.9 | 96.5 | 99.3 | 99.2 |

[1] Not detected.
[2] Less than amount fed.

EXAMPLE 2

Several runs were made in the reactor of Example 1 in which a stream of pure ethylene containing traces of oxygen and HCl was chlorinated using 2500 ml. of a garnet marketed as Florida "CSP" type (80-mesh) by Continental Minerals Processing Corporation. This was another variety of the andradite garnet of Example 1. The procedure followed was essentially the same as described in the previous example and only slightly different conditions were employed. The results obtained under the various conditions are presented in Table II. From these data, it will be readily seen that garnet is a highly effective catalyst for chlorinating a pure ethylene stream making it possible to conduct the chlorination at such a temperature level that some of the known disadvantages already mentioned which arise from the chlorination at higher temperatures can be obviated.

TABLE II

|  | Run Number | | | |
|---|---|---|---|---|
|  | 1 | 2 | 3 | 4 |
| Total Feed Gas Rate, s.c.f.h | 18 | 20.6 | 26.0 | 27.5 |
| Ethylene/Chlorine Ratio | 1.2:1 | 1.5:1 | 1.75:1 | 1.75:1 |
| Temperature, °C | 270–290 | 150–200 | 190–200 | 170–220 |
| Pressure, p.s.i.g | 10 | 7 | 7 | 7 |
| Conversion of $Cl_2$, Percent | 100 | 100 | 100 | 100 |
| Chlorinated Products in Effluent Gas, Mol Percent: [1] | | | | |
| 1,2-dichloroethane | 96.0 | 99.4 | 99.8 | 99.8 |
| Vinyl Chloride | 0.4 | 0.07 | 0.08 | 0.07 |
| Ethyl Chloride | 2.8 | 0.75 | 0.18 | 0.10 |
| Trans-dichloroethylene | 0.2 | | 0.0 | 0.0 |
| Cis-dichloroethylene | 0.3 | 0.07 | 0.0 | 0.0 |
| Trichloroethane | 0.5 | | 0.0 | 0.0 |
| Yield Loss of Chlorine to Chlorinated Impurities, Percent | 2.75 | 0.475 | 0.13 | 0.085 |
| Single Pass Conversion of Chlorine to 1,2-dichloroethane, Percent | 96.0 | 99.5 | 99.87 | 99.9 |

[1] Corrected for unreacted ethylene.

The invention has been described in detail in connection with one of its prefered applications to the production of 1,2-dichloroethane. It is to be understood, however, that the catalyst of the invention is equally applicable in the chlorination of olefins other than ethylene and that halogens other than chlorine can be used for reaction with the selected olefin. The term "olefin" as used herein is intended to include those unsaturated hydrocarbons possessing one or more olefinic bonds, said double bonds being between aliphatic carbon atoms. In addition to ethylene, for example, the process is useful for chlorination of such compounds as propylene, butenes, pentenes, butadiene, and the like as well as their homologs, analogs and substitution products. Olefins such as isobutylene, trimethyl ethylene, methyl ethyl ethylene and the like can also be reached using the catalytic process described herein. Also contemplated are olefins linked to a cyclic radical of the aromatic, alicyclic and heterocyclic series or the olefin may comprise an alicyclic structure. For example, phenyl and naphthyl ethylenes, propylenes, etc., are included in the list of suitable reactant olefins.

Variations in conditions from those given in the example, too, can be made without departing from the scope of the invention. For example, the garnet catalyst disclosed can be used for chlorinating olefins to olefin dihalides in practically any concentration from the pure material to gaseous mixtures from any source containing the olefin in concentrations as low as 0.1%, although the use of mixtures containing quantities of olefins below about 0.5% is considered uneconomical in actual practice. The process of the invention is particularly suitable for chlorinating olefins contained in gaseous mixtures produced by the autothermic cracking of aliphatic hydrocarbons such as ethane, propane, butane, etc., in the presence of small amounts of oxygen, commercial gases such as refinery waste gas or producer gas, and tail gases from olefin oxidation systems such as, for example, the tail gases from ethylene oxide units.

The particle size of the iron garnet catalyst is not critical. The garnet can be used in a fixed-bed operation in individual fragments, pieces, lumps or chunks of any practical size. In the preferred embodiment of the invention, however, the catalyst is employed in a fluidized or pseudo liquid state. While the particle size is not particularly critical in this type of operation, iron garnets in the form commonly known as "garnet sand" having a particle size in the range from about 50 to about 250 mesh and preferably from about 70 to about 200 mesh are best suited for maintenance in a fluid or suspended state by the gaseous feed material itself, or, optionally by the use of an inert gas introduced from an outside source.

The amount of halogen to be employed is that theoretically required to react completely with the olefin present by addition. Excesses of the halogen are to be avoided both for the sake of economy and to assist in keeping down side reactions particularly where the feedstream contains other hydrocarbons. The olefin, however, can be used in any excess within practical limits and will vary considerably with the temperature used. Generally, satisfactory results are obtained with olefin-halogen ratios of 1:1 to 2:1 and preferably molar ratios from 1:1 to 1.5:1 are employed.

The process of the invention can generally be carried out at temperatures in the range from about 20° C. to about 300° C. The particular temperature employed depends upon the olefin being reacted, its concentration in the feed gas stream, contact time and the level of conversion desired. Since the addition reaction liberates considerable heat, the particular reaction temperature is selected with the consideration in mind that the heat liberated will be absorbed or dissipated by the diluent gases present in the reaction stream along with the 1,2-dichloroethane. Thus, with mixed gas streams containing the olefin in relatively dilute concentration where the presence of an excess of gases other than the olefin assists in maintaining the reaction temperature at the desired level, lower temperature can be employed than in the reaction with the pure olefins. Also, higher temperatures may be used with shorter contact times while the longer contact times require proportionately lower temperatures. Preferably, for chlorination of ethylene in mixed streams, for example, the temperature is controlled between 120° and 170° C.; for purer streams of ethylene, slightly higher temperatures from about 150° to about 225° C. are used.

The process is preferably operated at atmospheric or super-atmospheric pressures. Pressures of from atmospheric to about 3 atmospheres may be advantageously employed although pressure is not a critical variable. Actually, subatmospheric pressures can be employed but offer no advantages.

Contact time will vary depending upon the temperature, the pressure, the relative amounts of the reactants in the reaction mixture and the desired degree of conversion per pass. Generally speaking, contact times from about 1 to about 30 seconds are employed. For most satisfactory operation, conditions are adjusted so that substantially all the halogen is reacted on one passage through the catalyst bed. At the preferred conditions of temperature, reactant ratio, etc., this can be accomplished by using contact times from about 5 to about 15 seconds.

Contact time as used herein is defined as follows:

$$\text{Contact time} = \frac{\text{bulk volume of catalyst in reactor}}{\text{volume of material fed to reactor at reaction temperature and pressure per unit of time}}$$

The presence of a minor amount of a hydrogen halide, preferably the hydroegn halide derived from the halogen used for the halogenation, increases the conversion of chlorine significantly. The hydrogen halide promoter can be added in an amount from as little as 0.1% of the olefin being halogenated to as much as an amount which is equimolecular to that of the olefin reactant but preferably amounts from about 0.5 to about 10% of the olefin are employed.

Separation of the product dihalide from the reactor effluent when necessary may be effected by any of several well known techniques such as condensation at low temperatures, extraction with a suitable solvent, adsorption on a suitable adsorption material such as charcoal, silica gel, clay, etc. Any unreacted olefin can be recycled to the reactor. Recovery of the dihalide from the condensate, adsorptive material, etc., is also accomplished by conventional means such as distillation, extraction and the like.

What is claimed is:

1. A process for producing ethylene dihalides which comprises reacting ethylene with approximately equimolecular proportions of a halogen in contact with a naturally-occurring mineral silicate of the iron garnet group at a temperatue in the range from about 150° to about 225° C. and at contact times from about 1 to about 30 seconds.

2. The process of claim 1 wherein said halogen is chlorine.

3. The process of claim 2 wherein said naturally-occurring mineral silicate of the iron garnet group is andradite.

4. The process of claim 3 wherein said contacting is effected by passing said ethylene and said chlorine through a fluidized bed of said andradite.

5. The process of claim 4 wherein said ethylene is contained in a gaseous mixture comprising compounds selected from the group consisting of hydrogen, minor amounts of other hydrocarbons, nitrogen and carbon dioxide.

6. The process of claim 5 wherein said temperature is in the range from about 120° to about 170° C.

7. The process of claim 6 wherein a minor amount of hydrogen chloride is added with the reactants.

References Cited

UNITED STATES PATENTS 2,658,087　11/1953　Landau et al. _____ 260—662
2,921,967　1/1960　Yaron _____ 260—662 X
3,363,010　1/1968　Schwarzenbek.

OTHER REFERENCES

Bashkirov et al.: "Chem. Abstracts," vol. 50, pp. 12,444–45 (1956).

LEON ZITVER, Primary Examiner

J. BOSKA, Assistant Examiner

U.S. Cl. X.R.

252—459